Dec. 2, 1969      H. LIST ET AL      3,481,191

ATTACHMENT TO FUEL CONSUMPTION METER

Filed Oct. 11, 1967      2 Sheets-Sheet 1

INVENTORS
H. List
BY E. Schreiber
Watson Cole Grindle &c ATTORNEYS

Dec. 2, 1969    H. LIST ET AL    3,481,191
ATTACHMENT TO FUEL CONSUMPTION METER
Filed Oct. 11, 1967    2 Sheets-Sheet 2

INVENTORS
H. List
BY E. Schreiber
Watson, Cole, Grindle & Watson
ATTORNEYS

United States Patent Office 3,481,191
Patented Dec. 2, 1969

3,481,191
ATTACHMENT TO FUEL CONSUMPTION METER
Hans List, 126 Heinrichstrasse, Graz, Austria, and Erich Schreiber, Graz, Austria; said Schreiber assignor to said List
Filed Oct. 11, 1967, Ser. No. 674,560
Claims priority, application Austria, Oct. 28, 1966, A 10,066/66
Int. Cl. G01l 3/26; G01f 9/02
U.S. Cl. 73—113         8 Claims

ABSTRACT OF THE DISCLOSURE

A fuel consumption meter having a fuel tank with a measuring bowl connected thereto by a feed pipe with a pump therein and a drain pipe emerging from the bowl and having an air collecting chamber inserted therein. The air collecting chamber is inserted in the drain pipe with a breather pipe emerging therefrom and a blocking device is arranged in the breather pipe to block the passage of fuel through the breather pipe during the measuring operation.

---

Figure 1:
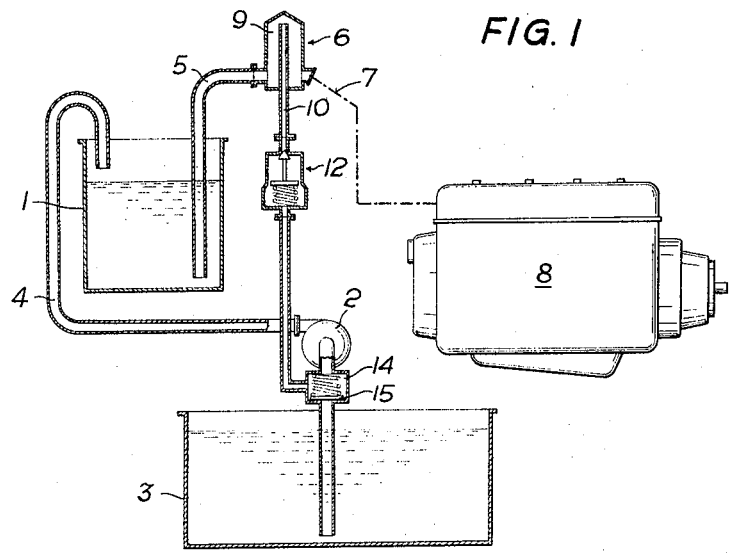

The invention relates to an attachment to a feul consumption meter comprising a measuring bowl and a drain pipe leading from the measuring bowl to the consuming unit.

In connection with the design and testing of internal combustion engines, accurate determination of fuel consumption is of prime importance. As automatic testing procedures became increasingly popular, predominantly automatic consumption meters, such as for example, fuel scales providing for the electronic processing of measured values have been devised permitting direct reading of the required consumption figures at the end of the measurement. With these, and in general, all the other conventional consumption meters wherein the consuming unit is fed from a measuring bowl via a drain pipe, air has been repeatedly found to collect in the drain pipe, such collections of air being liable to produce considerable divergences between individual fuel consumption data. For example, such collections of air at the top of the drain pipe are liable to occur during the emptying of the measuring bowl, when closing the drain pipe at the engine or as a result of recurring accumulation of small air bubbles carried along by the fuel during the operation of the measuring device. The risk of errors of measurement due to air collection is particularly great with automatic test benches which are usually subject to personal supervision and examination of the general condition of the equipment at relatively long intervals only.

It is therefore, the object of the present invention to provide an automatic attachment by means of which the above mentioned drawbacks of conventional fuel consumption meters can be eliminated. According to the invention, the top of the drain pipe is connected with an air collecting chamber which can be drained via a breather pipe associated with the attachment during the filling of the measuring bowl and comprising a blocking device for stopping the flow of fuel from or to the breather pipe for the purpose of preventing air from being trapped in the drain pipe at the beginning of each measurement, the air being removed at short intervals of anything between 1 and 5 minutes during each filling of the measuring bowl.

By the blocking of the breather pipe during the measuring operation objectionable influences on the result of consumption measurements due to an exchange of fuel between the drain pipe and the breather pipe owing to pressure differences are eliminated.

The attachment according to the invention can be readily incorporated in the automatic control system of automatic test benches and will not therefore, require any special attendance. The invention eliminates a source of errors the extent of which is hardly controllable, so that the data obtained by the measurements distinguish themselves by a high degree of accuracy.

According to a preferred embodiment of the invention the breather pipe terminates in the suction chamber of a fuel pump provided for the filling of the measuring bowl, an admission throttle preceding the said suction chamber. Thus the fuel pump which is already part of the outfit is used to produce the required vacuum in the breather pipe, at the same making sure that reduced pressure will prevail in the breather pipe actually between measurements, that is, during the refilling of the measuring bowl. By appropriately designing and dimensioning the admission throttle pressure can be reduced within certain limits as required. Likewise, it is possible for the admission throttle which may be designed for example, as a spring-loaded valve inserted in the suction port of the fuel pump, so that existing outfits can be equipped with the attachment according to the invention at very little expense.

Since the vacuum produced by a spring-loaded valve in the suction chamber of the pump is almost independent from the delivery of the pump, the same suction capacity will at all times be available also in the place where the breather pipe terminates in the air collecting chamber.

According to another feature of the invention, such consumption meters as do not have a delivery pump of their own, as is the case with valve-controlled fuel scales for example, provision can be made to evacuate the breather pipe by means of a separate air pump. Thus pressure in the breather pipe can be varied as required without any restriction.

According to a further embodiment of the invention the blocking device may be formed by a valve inserted in the breather pipe and spring-loaded in the direction of closing, such as for example, by a solenoid valve or a piston valve actuated by the vacuum in the breather pipe. This ensures positive sealing of the breather pipe during the measuring operation.

Where a solenoid valve serves as a blocking device, the winding of the solenoid valve is, according to the invention, set parallel to the driving motor of the fuel pump and of the air pump, if any. Thus the process of air evacuation is included in a simple manner in the automatic control system of the consumption meter.

Figure 2:
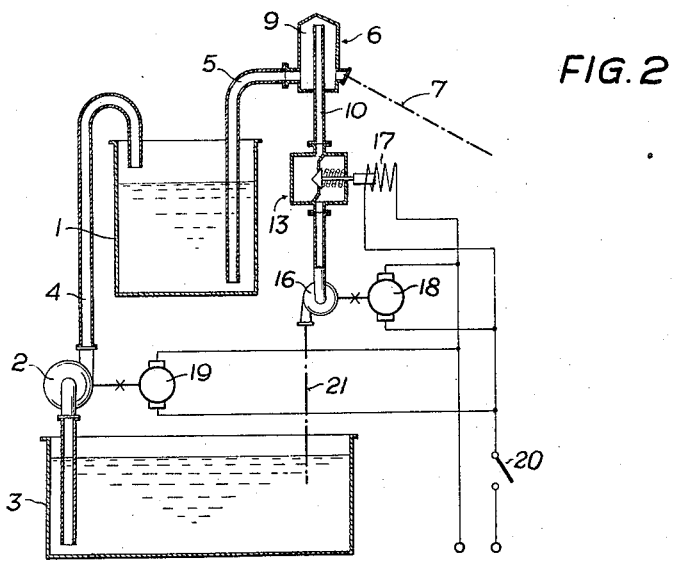
Figure 3:
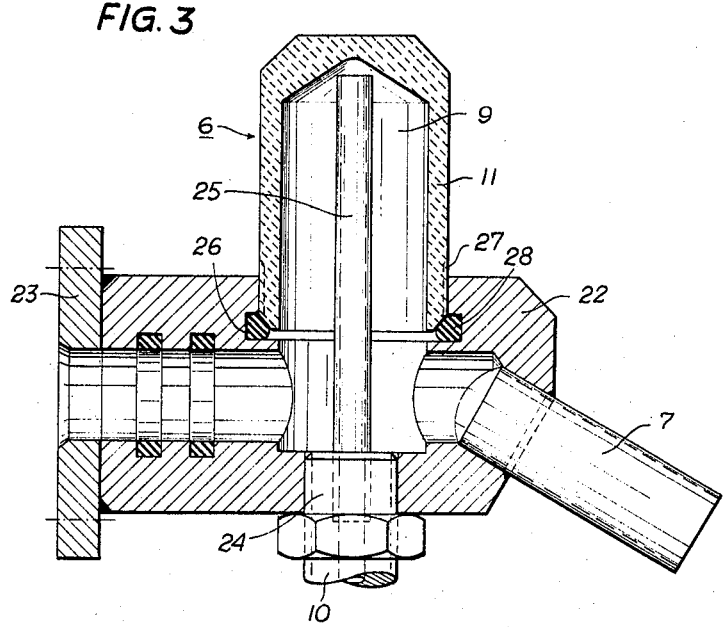
Figure 4:
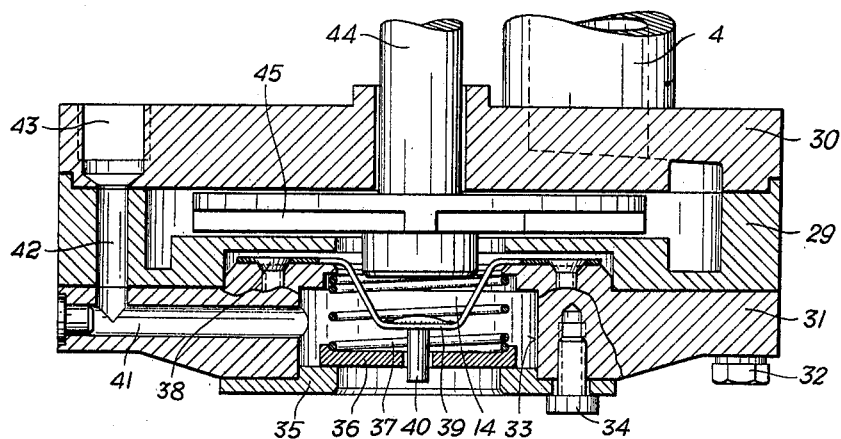

Further details of the invention will appear from the following description of several embodiments of the invention with reference to the accompanying drawings in which:

FIGS. 1 and 2 each show a schematic view of a fuel consumption meter equipped with an attachment according to the present invention limited to the essential portion of the installation as far as the invention is concerned, and FIGS. 3 and 4 are enlarged cross-sectional views of a detail each of the attachment according to the invention as shown in FIG. 1.

The fuel consumption meter, for example a fuel scale, comprises a measuring bowl 1 containing the fuel required for consumption measurement. The emptied measuring bowl 1 is refilled by means of a fuel pump 2, driven by electrical means for example, and drawing the fuel in from a reservoir 3 and delivering it via a feed pipe 4 to the measuring bowl 1. The fuel pump is in operation only during the intervals between successive measurements. With automatic test benches the fuel pump is generally included in the automatic control system of the measuring outfit.

During the measuring operation fuel is sucked in from the measuring bowl 1 via a drain pipe 5 extending as far as close to the bottom of the measuring bowl and passes via a collecting vessel 6 located at the top of the system via a descending fuel pipe 7 to the consuming unit, for example a fuel injection engine 8 (FIG. 1).

The collecting vessel 6 is an upright hollow cylinder containing an air-collecting chamber 9, from which air can be evacuated via a central vertical breather pipe 10 extending as far as close to the upper front wall of the collecting vessel 6. The upper portion of the collecting vessel 6 is designed sight-glass-fashion as a cap 11 made of some transparent material. Such air bubbles as are carried along by the fuel during the operation as well as air bubbles rising in the fuel pipe 7 and/or in the drain pipe 5 after assemblies and when the measuring bowl 1 is emptied completely, form an air pocket in the collecting vessel 6 as revealed by a drop of the fuel level in the cap 11.

In order to evacuate the air trapped in the collecting vessel 6, pressure in the breather pipe 10 is reduced. However, this can be done only during an interval between two successive measurements, that is, during the refilling of the emptied measuring bowl 1. While the measurement is in progress, however, any exchange of fuel between the collecting vessel 6 and the breather pipe 10 must be avoided in order to preclude measuring errors. For the purpose, a blocking device is incorporated in the breather pipe 10, the said blocking device being designed as a vacuum-operated piston valve 12 in the case of the simplified embodiment of the invention shown in FIG. 1, or as a solenoid valve 13 in the embodiment illustrated in FIG. 2. Both types of valves comprise valve bodies which are spring-loaded in their closing direction.

The vacuum required for the removal of air from the collecting vessel 6 can be produced by different means. In the example shown in FIG. 1 the breather pipe 10 terminates directly in the suction chamber 14 of the fuel pump 2 preceded by an admission throttle 15 producing an increasingly negative pressure in the suction chamber 14 while the fuel pump 2 is in operation. As soon as the negative pressure has attained the value to which the piston valve 12 is designed to respond, the latter opens and the air contained in the collecting vessel 6 is evacuated through the breather pipe 10. When the fuel pump 2 is switched off following the refilling of the measuring bowl 1, the spring-loaded piston valve 12 automatically returns to its closed position.

The attachment shown in FIG. 2 comprises a separate air pump 16 connected to the breather pipe 10 for the production of the required vacuum. In order to ensure proper synchronization between the process of air removal and the filling of the measuring bowl 1, the winding of the solenoid valve 13, the electric motor 18 provided for the operation of the air pump 16 and the motor 19 of the fuel pump 2 are set in parallel relation to each other and switched on by means of a common main switch 20 which may be incorporated in the program control of an automatic test bench. A special return pipe 21 is connected with the pump 16 for the purpose of returning such fuel as may still remain in the breather pipe 10 after the completion of the air removal stage, to the reservoir 3.

The embodiments of the invention illustrated in FIGS. 1 and 2 by way of examples only, can be arranged in various combinations to meet individual requirements. For example, where a high degree of accuracy is required of the measurements, a solenoid valve (as in FIG. 2) may be used in lieu of the piston valve 12 in conjunction with the embodiment of the invention shown in FIG. 1, in parallel connection with the driving motor of the fuel pump 2. This arrangement ensures a high degree of dependability obtained at low structural expense.

FIG. 3 shows a preferred variant of the collecting vessel 6, comprising a housing 22 with a lateral connection flange 23 for the drain pipe 5 (not shown). The downwardly inclined fuel pipe 7 leading to the consuming unit is soldered into an oblique bore of the housing 22 registering with the connection flange 23. A screw bolt 24 is screwed into the housing 22 from below, the said plug having a central bore wherein a tube 25 transversely extending through the housing 22 is inserted. On this side the housing 22 presents a taphole 27 terminating in an annular groove 26 wherein the transparent cap 11 is screwed. The cap 11 is sealed off against the housing 22 by means of a gasket 28 inserted in the annular groove 26. The blocking device of the breather pipe is attached to the screw bolt 24 in a manner not shown in the drawing.

FIG. 4 shows the outfit of the fuel pump 2 for the suction-end connection of the breather pipe 10. A cover 31 is secured by means of bolts 32 to the suction end 29 of the pump casing 30. The cover 31 presents a stepped cylindrical through bore 33 in alignment with a registering bore of the front end 29. In front of the bore 33 the seat frame 35 of a throttle is secured to the cover 31 by means of bolts 34. The throttle comprises a valve plate 36 loaded by means of a compression spring 37 and resting on the seat frame 35. A bracket 39 secured to the back of the cover 31 by means of screws 38 carries a guide pin 40 extending through the centre of the valve plate 36.

The interior of the stepped bore 33 communicated via a radial connecting passage 41 and a connecting bore 42 extending in transverse relation thereto and provided with an internal thread 43, with the breather pipe 10 (not shown) to be screwed into the said internal thread. The negative pressure attainable inside the bore 33 is a function of the diameter of the valve plate 36 and of the dimensions of the compression spring 37.

We claim:
1. A fuel consumption meter comprising a fuel tank, a measuring bowl connected with the fuel tank via a feed pipe, a fuel pump inserted in the said feed pipe, a drain pipe emerging from the said measuring bowl, the consuming unit being connected with the said drain pipe, an air-collecting chamber inserted in the said drain pipe at the topmost portion thereof, a breather pipe emerging from the said air-collecting chamber, and a blocking device arranged in the said breather pipe and blocking the passage of fuel through the breather pipe during the measuring operation only.

2. A fuel consumption meter comprising a fuel tank, a measuring bowl connected with the fuel tank by means of a feed pipe, a fuel pump inserted in the said feed pipe, a drain pipe emerging from the said measuring bowl, a consuming unit connected with the said drain pipe, an air-collecting chamber inserted in the said drain pipe at the topmost portion thereof, a breather pipe emerging from the said air-collecting chamber, and a blocking device arranged in the said breather pipe and blocking the passage of fuel through the breather pipe during the measuring operation, the said fuel pump comprising an admission throttle preceding a suction chamber of the fuel pump, the said breather pipe terminating in the said suction chamber of the fuel pump.

3. A fuel consumption meter comprising a fuel tank, a measuring bowl connected with the fuel tank by means of a feed pipe, a fuel pump inserted in the said feed pipe, a drain pipe emerging from the said measuring bowl, a consuming unit connected with the said drain pipe, an air-collecting chamber inserted in the said drain pipe at the topmost portion thereof, a breather pipe emerging from the said air-collecting chamber, and a blocking device arranged in the said breather pipe and blocking the passage of fuel through the breather pipe during the measuring operation, and an air pump connected to the end of the said breather pipe.

4. A fuel consumption meter comprising a fuel tank, a measuring bowl connected with the fuel tank by means of a feed pipe, a fuel pump inserted in the said pipe, a drain pipe emerging from the said measuring bowl, a consuming unit connected with the said drain pipe, an air-collecting chamber inserted in the said drain pipe at the topmost portion thereof, a breather pipe emerging from the said air-collecting chamber, and a blocking device arranged in the said breather pipe and blocking the passage of fuel through the breather pipe during the measuring operation, the said blocking device comprising a valve which is spring-loaded in the closing direction and inserted in the said breather pipe.

5. A fuel consumption meter as claimed in claim 4 wherein the said valve is a solenoid valve, and in which means are provided to actuate the solenoid valve.

6. A fuel consumption meter as claimed in claim 5, comprising an electric motor drivingly connected with the said fuel pump, a solenoid valve, the windings of which are set electrically parallel to the said electric motor of the fuel pump.

7. A fuel consumption meter as claimed in claim 6, comprising an electric motor drivingly connected with the said fuel pump, an air pump connected to the end of the said breather pipe, another electric motor drivingly connected with the said air pump, a solenoid valve, the windings of which are set electrically parallel both to the electric motor of the fuel pump and to the electric motor of the air pump.

8. A fuel consumption meter as claimed in claim 4, wherein the said valve is a piston valve actuated by the vacuum in the said breather pipe.

References Cited

UNITED STATES PATENTS 2,049,239 7/1936 Wilcox.
3,252,322 5/1966 Pring _____ 73—113

RICHARD C. QUEISSER, Primary Examiner

JERRY W. MYRACLE, Assistant Examiner

U.S. Cl. X.R.

73—200